US010645489B2

(12) United States Patent
Toda et al.

(10) Patent No.: US 10,645,489 B2
(45) **Date of Patent: *May 5, 2020**

(54) SOUND SYSTEM FOR VEHICLE

(71) Applicant: Mazda Motor Corporation, Aki-gun, Hiroshima (JP)

(72) Inventors: Isao Toda, Hatsukaichi (JP); Kenji Asada, Higashihiroshima (JP); Katsumasa Sogame, Higashihiroshima (JP); Hironobu Hashiguchi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,032

(22) Filed: May 7, 2018

(65) Prior Publication Data

US 2018/0332388 A1 Nov. 15, 2018

(30) Foreign Application Priority Data

May 11, 2017 (JP) ................................ 2017-094622

(51) Int. Cl.
*H04B 1/00* (2006.01)
*H04R 1/40* (2006.01)
*G10K 11/18* (2006.01)
*G10K 15/02* (2006.01)
(Continued)

(52) U.S. Cl.
CPC ............. *H04R 1/403* (2013.01); *G10K 11/18* (2013.01); *G10K 15/02* (2013.01); *H04R 1/025* (2013.01);
(Continued)

(58) Field of Classification Search
CPC .......... H04R 1/403; H04R 1/025; H04R 3/12; H04R 5/02; H04R 2205/024;
(Continued)

(56) References Cited

U.S. PATENT DOCUMENTS

2006/0062411 A1* 3/2006 Sako ....................... H04S 3/002 381/310
2007/0223728 A1* 9/2007 Sakamoto ................ H04S 3/00 381/86

(Continued)

FOREIGN PATENT DOCUMENTS

GB 2539482 A 12/2016
JP H0585288 A 4/1993

(Continued)

OTHER PUBLICATIONS

European Patents Office, Extended European Search Report Issued in Application No. 18000413.7, dated Oct. 10, 2018, Germany, 10 pages.

*Primary Examiner* — Anmar T Hamid
(74) *Attorney, Agent, or Firm* — Alleman Hall Creasman & Tuttle LLP

(57) ABSTRACT

A sound system for a vehicle including an engine and an audio device for an internal space of a cabin as sound sources disposed at given positions of the vehicle is provided which includes an engine sound localizer configured to localize a first sound generated by the engine to cause a vehicle driver inside the cabin to hear the first sound from a first position, and change the first position, and a traveling state detector configured to detect a traveling state of the vehicle. The engine sound localizer normally sets the first position at a default position and, when a given traveling state is detected by the traveling state detector, changes the first position to a specific position at which the vehicle driver is able to recognize the engine sound more clearly than at the default position.

16 Claims, 10 Drawing Sheets

(51) Int. Cl.

| | |
|---|---|
| ***H04S 7/00*** | (2006.01) |
| ***H04R 1/02*** | (2006.01) |
| *H04R 5/02* | (2006.01) |
| *H04R 3/12* | (2006.01) |

(52) U.S. Cl.
CPC ................ *H04S 7/302* (2013.01); *H04R 3/12* (2013.01); *H04R 5/02* (2013.01); *H04R 2205/024* (2013.01); *H04R 2420/03* (2013.01); *H04R 2499/13* (2013.01)

(58) Field of Classification Search
CPC ....................... H04R 2420/03; H04R 2499/13; G10K 11/18; G10K 15/02; H04S 7/302
USPC .................................................... 381/86, 302
See application file for complete search history.

(56) References Cited

U.S. PATENT DOCUMENTS

| | | | |
|---|---|---|---|
| 2007/0268415 | A1 | 11/2007 | Ukyou et al. |
| 2012/0114130 | A1 | 5/2012 | Lovitt |
| 2014/0198933 | A1 | 7/2014 | Totsuka et al. |
| 2016/0345115 | A1 | 11/2016 | Paik |

FOREIGN PATENT DOCUMENTS

| | | | |
|---|---|---|---|
| JP | 2776092 | B2 | 7/1998 |
| JP | 2007010810 | A | 1/2007 |
| JP | 2007253772 | A | 10/2007 |
| JP | 2007308084 | A | 11/2007 |

* cited by examiner

SOUND SYSTEM FOR VEHICLE

TECHNICAL FIELD

The present disclosure relates to sound systems for vehicles.

BACKGROUND OF THE DISCLOSURE

Vehicles are generally equipped with audio devices that play an audio sound in a cabin. JP2776092B and JP1993-085288A disclose audio devices that perform localization of an audio sound so that a person(s) on board is able to hear the audio sound from a given position in a cabin.

Meanwhile, vehicles which are focused on the enjoyment of traveling, such as sports cars, are required to actively cause a person(s) on board, especially a vehicle driver, to hear (listen to) an engine sound. That is, since the engine sound is a good indication of a vehicle state, it becomes an extremely important element in the enjoyment of traveling. Therefore, when the audio device is operating, how to effectively cause the person(s) on board to hear the engine sound while also hearing the audio sound is important.

SUMMARY OF THE DISCLOSURE

The present disclosure is made in view of the above situations and aims to provide a sound system for a vehicle, which is capable of causing person(s) on board to hear an audio sound while also hearing an engine sound more clearly as needed.

In order to achieve the above aim, according to one aspect of the present disclosure, a sound system for a vehicle including an engine and an audio device for an internal space of a cabin as sound sources disposed at given positions of the vehicle is provided, which includes an engine sound localizer configured to localize a first sound generated by the engine to cause a vehicle driver inside the cabin to hear the first sound from a first position, and change the first position, and a traveling state detector configured to detect a traveling state of the vehicle. The engine sound localizer normally sets the first position at a default position and, when a given traveling state is detected by the traveling state detector, changes the first position to a specific position at which the vehicle driver is able to recognize the engine sound more clearly than at the default position.

According to this structure, in the given traveling state, since the engine sound is localized to the specific position from which the driver can easily recognize the engine sound (especially the change thereof) more clearly, the driver is able to recognize a state of the vehicle more clearly based on the engine sound, and it is highly preferable for enjoying driving and safe driving.

The sound system may further include an audio sound localizer configured to localize a second sound generated by the audio device to cause the driver to hear the second sound from a second position that is different from the first position. Thus, the driver clearly distinguishes the engine sound and the audio sound, and it is preferable for causing him/her to clearly recognize the engine sound while enjoying the audio sound.

The specific position may be located upward of the default position. This setting of the specific position is preferable because the engine sound is easy to be recognized when the localized position is located upward.

The specific position may be located forward of the default position. This setting of the specific position is preferable because the engine sound is easy to be recognized when the localized position is located forward.

The default position may be set lower than an upper surface of an instrument panel, and the specific position may be set forward of the driver, at the same height of or higher than the upper surface of the instrument panel. In this case, more concrete setting of the default position and the specific position is performed while locating the specific position upward.

The default position may be set rearward of an instrument panel and lower than an upper surface of the instrument panel, and the specific position may be set forward of the driver, at the same height of or higher than the upper surface of the instrument panel. In this case, more concrete setting of the default position and the specific position is performed while locating the specific position upward and forward.

The default position may be set lower than the second position, and the specific position may be set higher than the second position. It is preferable for enjoying the audio sound sufficiently when the engine sound is localized to the default position while recognizing the engine sound sufficiently when the engine sound is localized to the specific position.

The given traveling state may be a traveling state where an operation load on a person in the vehicle increases. Thus, since it is important to more clearly recognize the vehicle state when the operation load is high, by localizing the engine sound to the specific position in such a case, the driver is able to recognize the engine sound more clearly and thus recognize the vehicle state based on (the change of) the engine sound.

DETAILED DESCRIPTION OF THE DISCLOSURE

Figure 1:
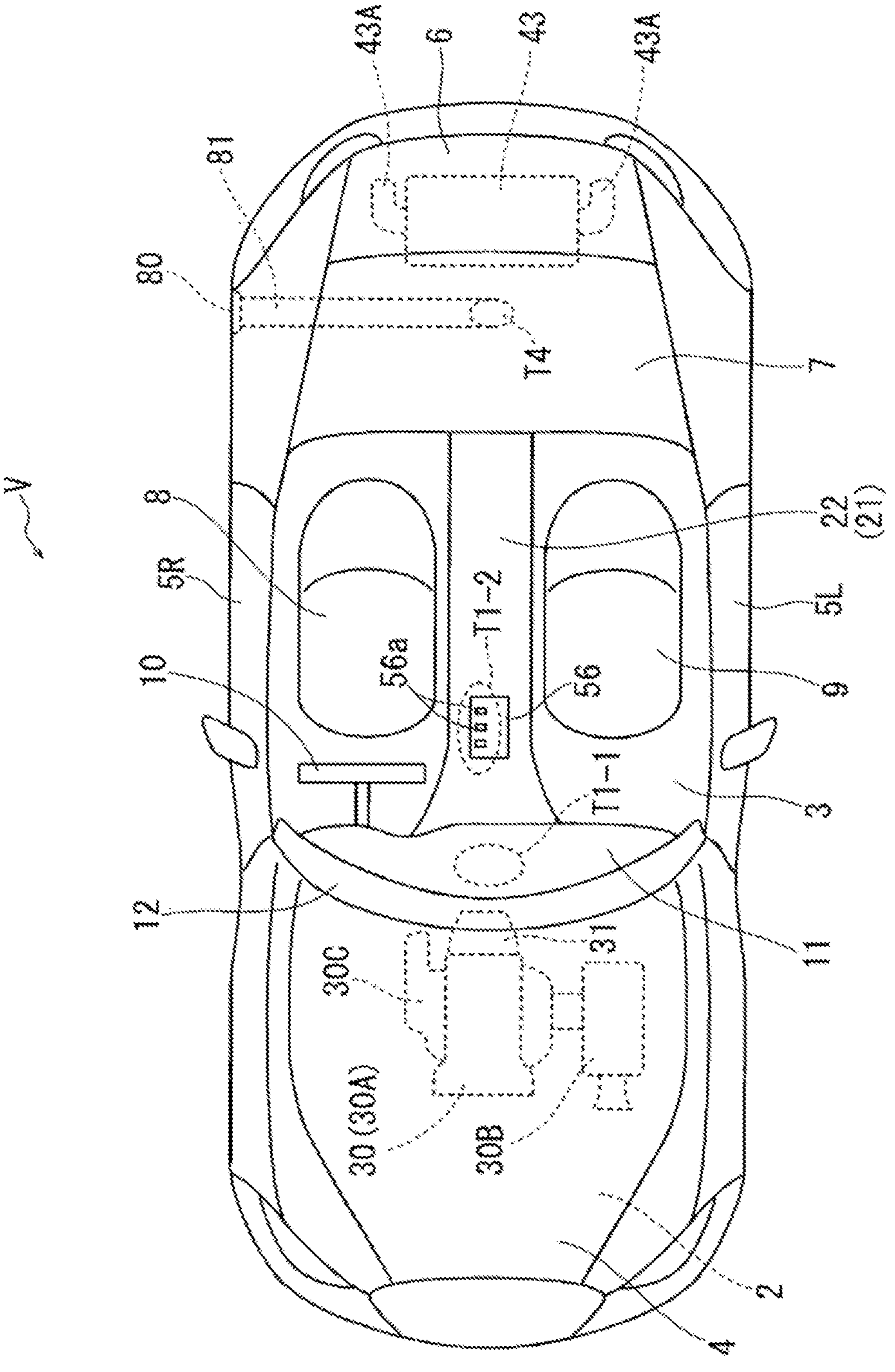
FIG. 1 is a plan view illustrating one example of a vehicle to which the present disclosure is applied.
Figure 2:
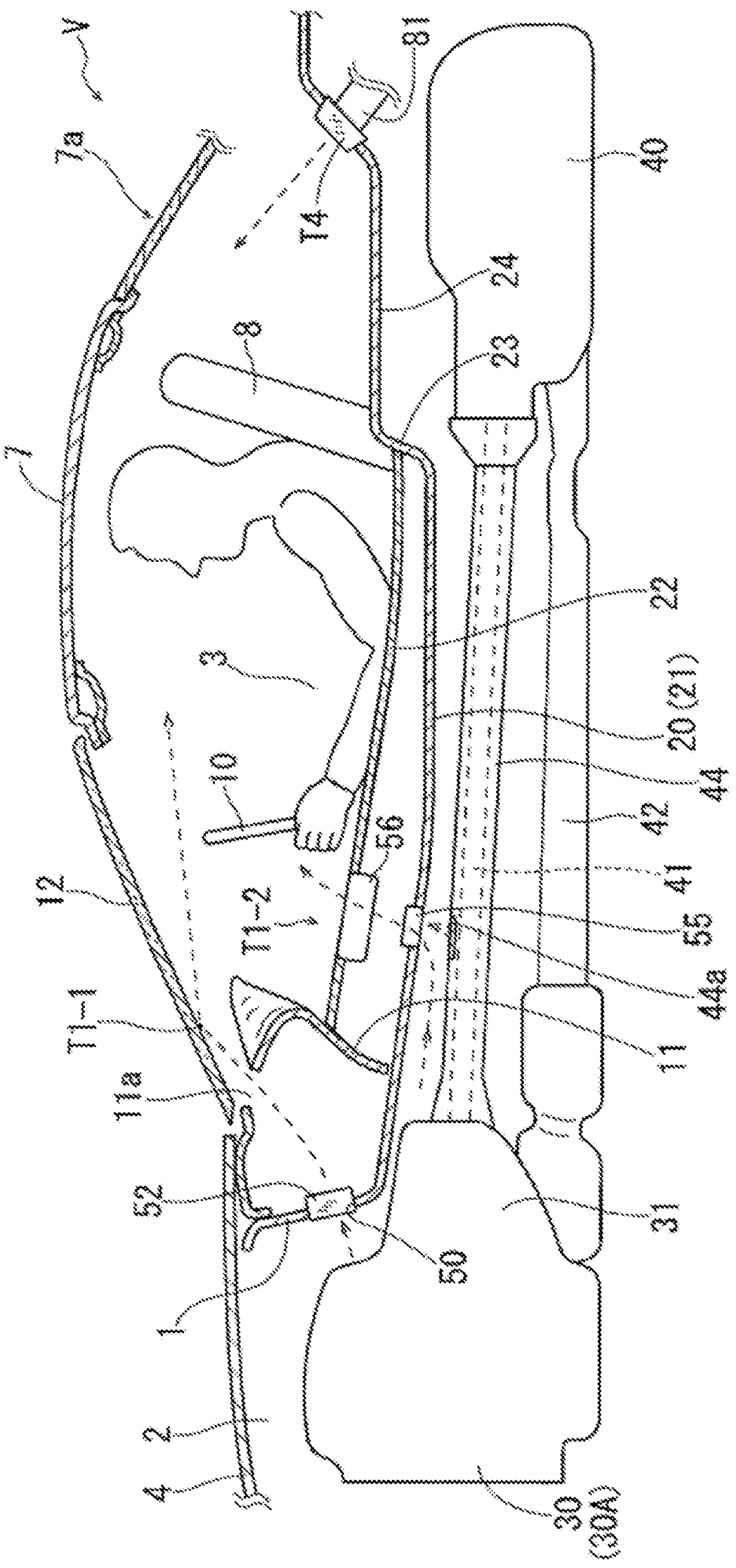
FIG. 2 is a cross-sectional side view of a part of the vehicle illustrated in FIG. 1.

In FIGS. 1 and 2, a vehicle V of this embodiment is a two-door convertible. Here, the reference character "1" is a dashboard dividing an engine bay 2 from a cabin 3. The reference character "4" is a hood covering the engine bay 2 from the top thereof, the reference characters "5R" and "5L" are a pair of left and right side-doors, the reference character "6" is a trunk lid, and the reference character "7" is a roof. Further, the reference character "8" is a driver seat, the reference character "9" is a front passenger seat, and the reference character "10" is a steering wheel. Additionally, the reference character "11" is an instrument panel and the reference character "12" is a front windshield.

As illustrated in FIG. 2, the roof 7 has a rear windshield 7*a*. FIG. 2 illustrates a state where the roof 7 is closed, i.e., the top of the cabin 3 is covered by the roof 7. Although FIG. 1 also illustrates the closed roof 7, the roof 7 is seen through and an upper end part of the front windshield 12 is partially cut out for the sake of illustration.

A floor panel 20 constituting a floor surface of the cabin 3 has a tunnel part 21 extending front-and-rear directions (longitudinal directions) of the vehicle in its center part in left-and-right directions (lateral directions, width directions) of the vehicle, and an upper surface of the tunnel part 21 is covered by a trim member 22. A rear end part of the floor panel 20 connects to a rear panel 24 via a kick-up part 23.

The engine bay 2 formed forward of the dashboard 1 is provided with an engine 30. The engine 30 of this embodiment is placed longitudinally. An engine body is denoted with "30A," an intake-system member is denoted with "30B," and an exhaust-system member is denoted with "30C." A transmission 31 is coupled to a rear part of the engine 30 (engine body 30A).

Note that although the engine 30 is equipped with auxiliary equipment, such as an alternator and an air-conditioning compressor which are driven by the engine body 30A, they are not illustrated. An engine sound is a mixture of a sound generated when the engine body 30A rotates or performs combustion, an intake sound, an exhaust sound, and also a sound of the auxiliary equipment being driven.

The differential (differential gear) 40 is disposed in a rear part of the vehicle V. The differential 40 is coupled to the transmission 31 (i.e., the engine 30) via a propeller shaft 41. That is, the vehicle V of this embodiment is a rear-wheel drive vehicle. Further, the transmission 31 and the differential 40 are coupled by an annular-shaped torque tube 44 disposed to wrap around the propeller shaft 41 (see also FIG. 6).

An exhaust passage 42 extends rearward from the engine 30. This exhaust passage 42 is connected to a muffler 43 disposed under the rear part of the vehicle. The muffler 43 is connected to a pair of left and right exhaust pipes 43A opening rearward. The exhaust gas is finally discharged outside (to the atmosphere) from the exhaust pipes 43A.

Figure 4:
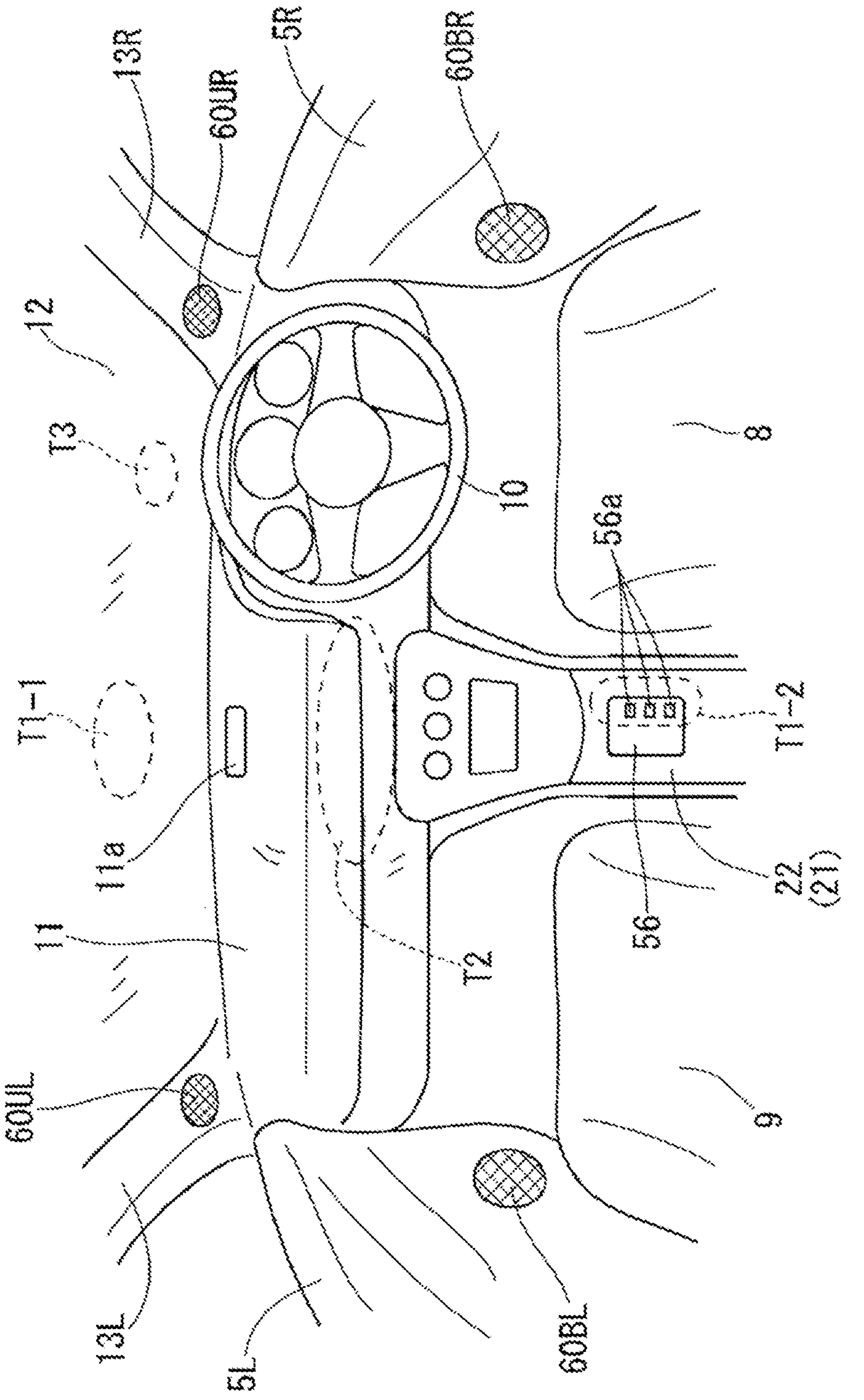
FIG. 4 is an elevational view of a cabin seen forward from a rear part thereof, illustrating one example of localized positions of an engine sound, an audio sound, and an alarm sound.
Figure 5:
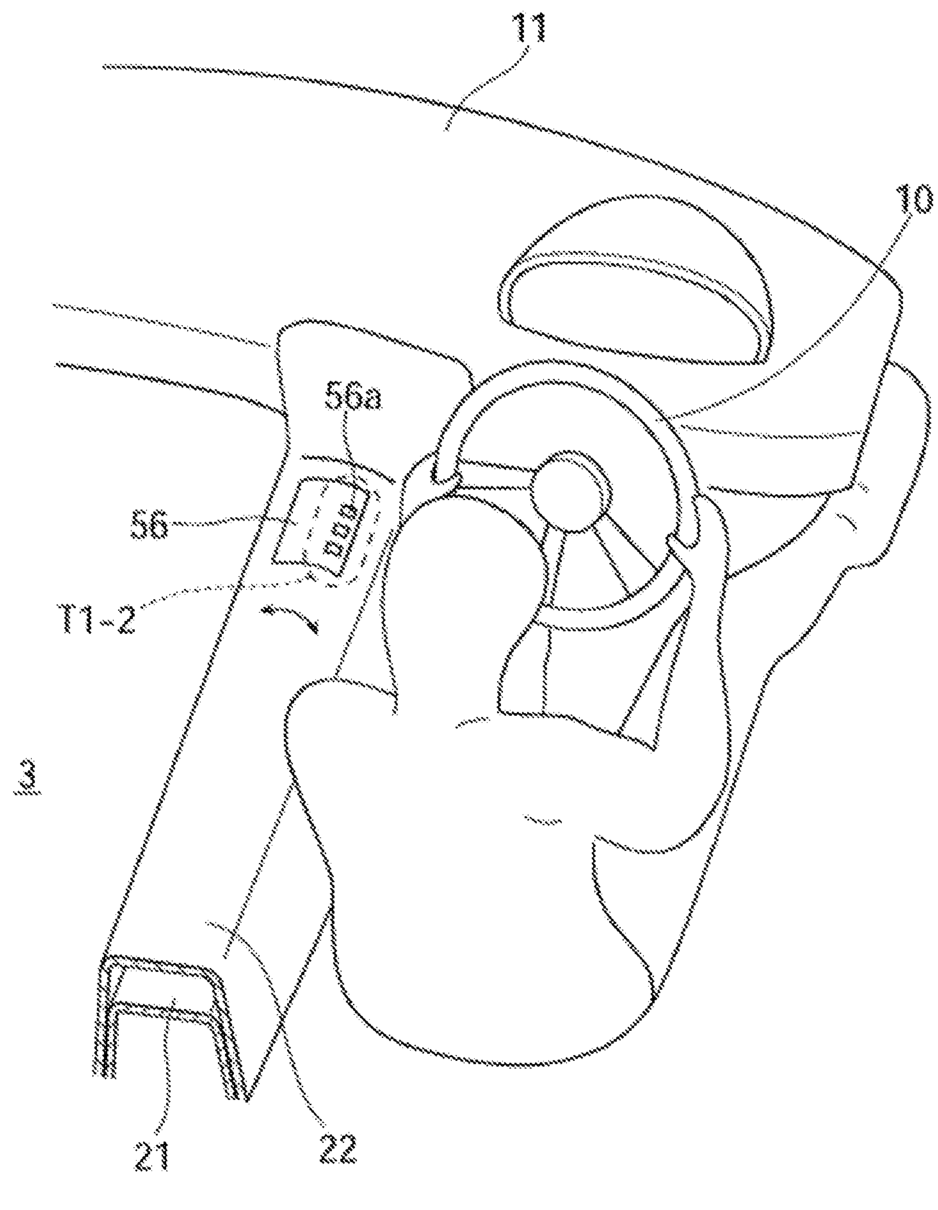
FIG. 5 is a top perspective view illustrating a default position for the localized position of the engine sound.

Next, localization of the engine sound and an audio sound will be described. First, as illustrated in FIG. 4, a first position (section or area) to which the engine sound is localized is set at two locations of a default position (reference position) T1-2 and a specific position T1-1. A second position to which the audio sound is localized is denoted with the reference character "T2." Additionally, in this embodiment, an alarm sound is localized to a third position T3. As described later, one of the specific position T1-1 and the default position T1-2 which are the localized position of the engine sound is selectively used based on a given condition (traveling condition).

The specific position T1-1, the second position T2, and the third position T3 of this embodiment are individually set to be located forward of a vehicle driver seated at the driver seat 8. That is, the specific position T1-1 is set in the front windshield 12. For example, the specific position T1-1 is set in a center part of the front windshield 12 in the width directions, substantially at the same height as the driver's eyes.

Further, the second position T2 is set at a position lower than the specific position T1-1 by a given distance. For example, the second position T2 is set to be located in a substantially center part of a surface of the instrument panel 11 facing substantially rearward. This second position T2 is set to have a wider area than the specific position T1-1 in the width directions (to cause the driver and the front passenger hear the audio sound). Note that the specific position T1-1 and the second position T2 are separated from each other by the given distance so that the engine sound and the audio sound are distinguishable from each other, and the given distance is at least 30 cm, more preferably 50 cm or more.

The third position T3 is set to be located in an extension of a driver's line of sight when the driver who is seated on the driver seat 8 looks forward. The third position T3 may be set, for example, in the front windshield 12. Although it may be further forward of the front windshield 12, it is more preferably set at a position at which information is presented to the driver by a head-up display.

The default position T1-2 is set in an upper surface of a front-end part of the trim member 22 covering the tunnel part 21. That is, the default position T1-2 is set near driver's feet.

Note that the areas of the localized positions T1-1, T2, and T3 are not limited to those illustrated and may be, for example, wider areas in the width directions and/or up-and-down directions of the vehicle. The position of T1-1 may be variable within the front windshield 12 according to the vehicle state, such as a steering angle.

The switch (selection) of the localized position of the engine sound between the default position T1-2 and the specific position T1-1 is performed according to the traveling state of the vehicle, especially an operation load. That is, when the operation load is low, the default position T1-2 is selected, and when the operation load is high, the specific position T1-1 is selected. Since the driver's recognition of the sound from forward or above is higher than that of the sound from below or rearward, the recognition of the engine sound becomes higher when the engine sound is localized to the specific position T1-1 than to the default position T1-2. Especially since the driver drives while paying close attention forward, setting the specific position T1-1 forward of the driver, such as at the front windshield 12, makes it easier for the engine sound to be more clearly recognized.

The state where the operation load becomes high, which is when the specific position T1-1 is selected, is also considered to be a situation where driving (running) is actively performed, for example, when an engine speed is as high as above a given speed, when G (g-force) which acts on a vehicle body (one or both of lateral acceleration and longitudinal acceleration) is higher than a given value, when traveling on a winding road, when acceleration/deceleration is frequently performed, when a steering operation is frequently performed, when traveling on a mountain road, when traveling on a circuit road, when a vehicle speed is high (e.g., above 80 km/h), etc. Furthermore, a mode switch which is manually controlled by the driver may be provided so that the switch between the specific position T1-1 and the default position T1-2 may be performed according to the control of the mode switch.

Note that the switch between the specific position T1-1 and the default position T1-2 is performed swiftly (instantly) in this embodiment, but it may be performed gradually (e.g., over about 2 to 3 seconds). Further, while the switch from the default position T1-2 to the specific position T1-1 is performed swiftly, the (switch) resumption from the specific position T1-1 to the default position T1-2 may be performed gradually.

Figure 3:
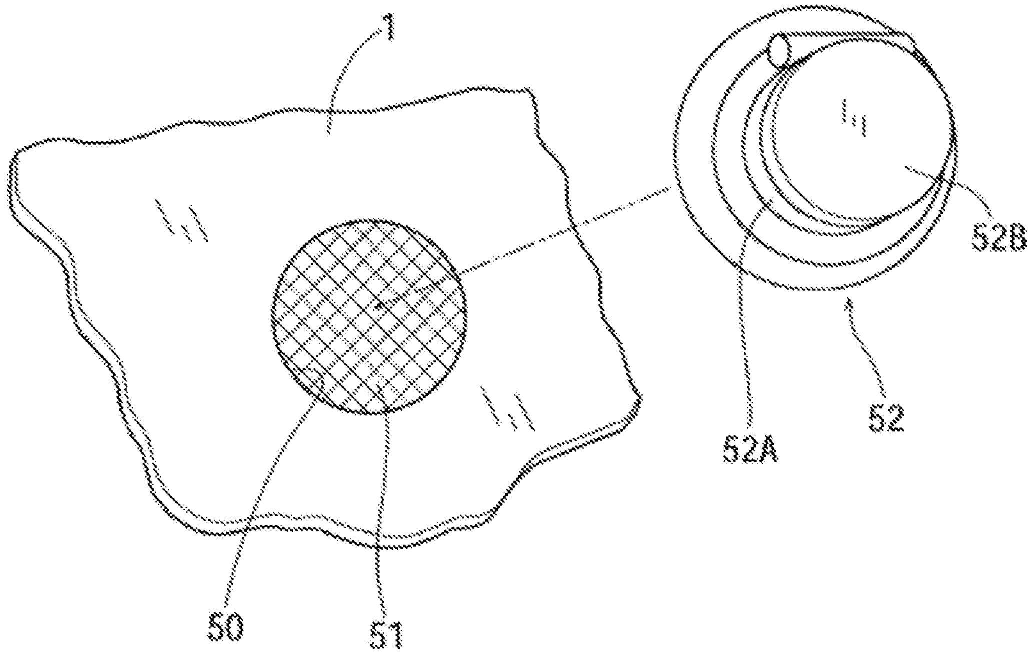
FIG. 3 is an exploded perspective view illustrating a structure of an engine sound transparent section formed in a dashboard.

Next, a specific structural example in which the engine sound is localized to the specific position T1-1 will be described. First, as illustrated in FIG. 3, the dashboard 1 is formed with an opening 50 at a position equivalent to that of the engine 30 (engine body 30A) in height (up-and-down directions) and in the width directions. This opening 50 communicates the engine bay 2 with the inside of (a space formed by) the instrument panel 11. Further, the opening 50 is covered by a film member 51 which blocks air and liquid. Thus, the engine sound from the engine bay 2 is effectively transmitted into the instrument panel 11 by vibrating the film member 51.

The instrument panel 11 is formed with an opening 11*a* in its upper surface (see FIG. 2). The engine sound transmitted into the instrument panel 11 is further transmitted toward the front windshield 12 through the opening 11*a* and reflects on the front windshield 12 to be transmitted to the driver seated on the driver seat 8. Thus, the specific position T1-1 is a section where the engine sound reflects on the front windshield 12. Air and liquid in the engine room 2 are prevented from flowing into the cabin 3 by being sealed by the film member 51.

As illustrated in FIG. 3, the opening 50 covered by the film member 51 is attached with a valve member 52. The valve member 52 has a short cylindrical member 52A extending to the opening 50 and an electromagnetic valve body 52B that opens and closes the cylindrical member 52A. By opening the valve member 52, the engine sound from the opening 50 is transmitted into the instrument panel 11 through the cylindrical member 52A (the localization to the specific position T1-1 is achieved). By closing the valve member 52, the localization of the engine sound to the specific position T1-1 is not performed.

Next, a specific example of localizing the engine sound to the default position T1-2 will be described. First, a valve member 55 is disposed to an opening formed in an upper surface of a front-end portion of the tunnel part 21. The valve member 55 has substantially the same structure as the valve member 52 illustrated in FIG. 3 described above. That is, the opening formed in the tunnel part 21 is covered by a film member that blocks air, and the valve member 55 is attached thereto. Further, an opening 44*a* is formed in an upper surface of the torque tube 44, at a position near the valve member 55. Thus, the engine sound from the engine bay 2 is transmitted to the position of the valve member 55 via the inside of the torque tube 44, the opening 44*a*, and the inside of the tunnel part 21. In this manner, it is structured so that the engine sound is sufficiently transmitted to the part of the valve member 55.

Figure 6:
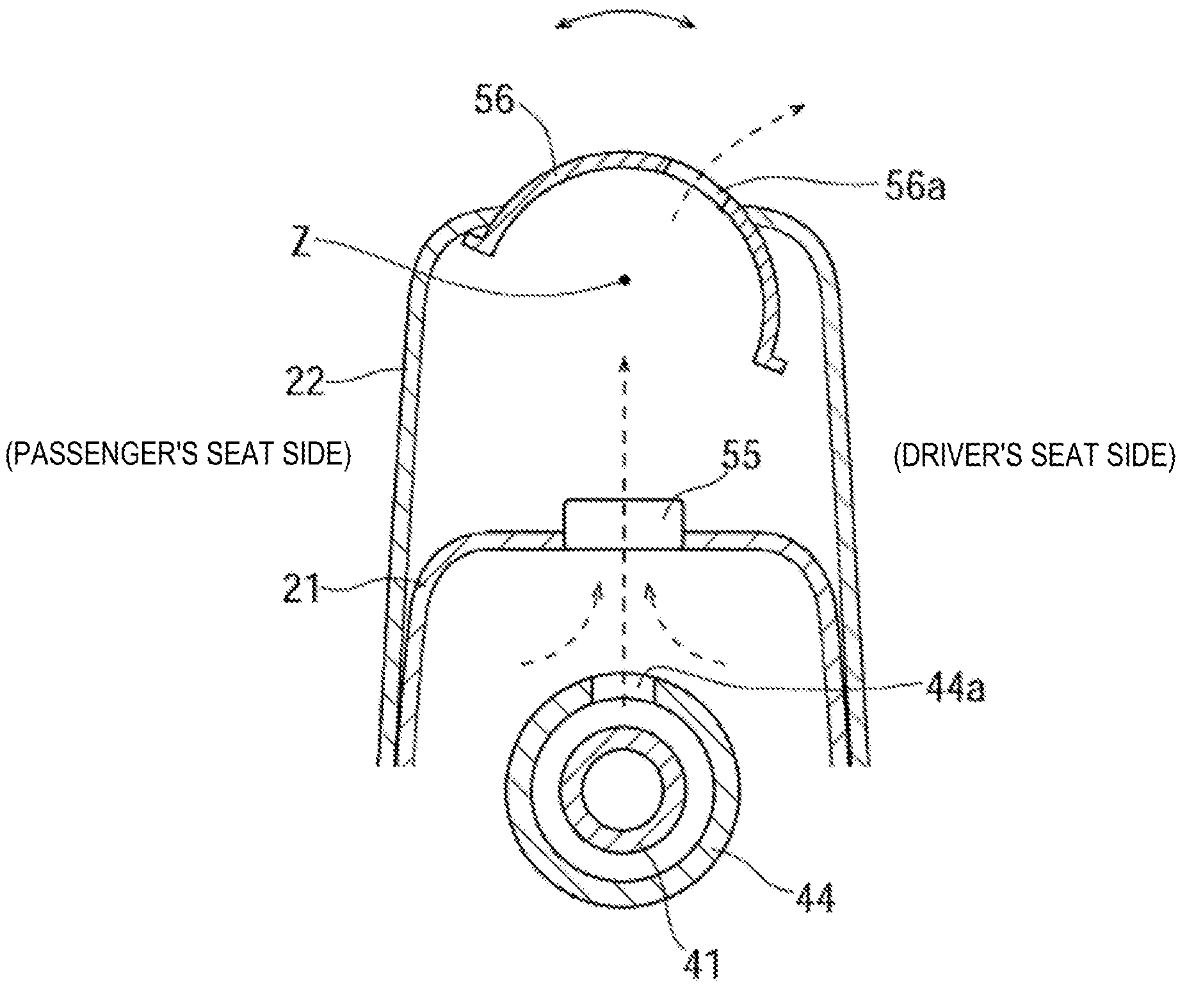
FIG. 6 is a cross-sectional view of a main part at the default position illustrated in FIG. 5.

A rotatable member 56 is provided to an upper surface of the front-end part of the trim member 22 covering the tunnel part 21. As illustrated in FIG. 6, the rotatable member 56 is formed by an arc-shaped plate member substantially constituting a part of the upper surface of the trim member 22 and is formed with an opening 56*a* in a part thereof. The rotatable member 56 is rotatable about an axis Z extending in a direction perpendicular to the sheet of FIG. 6 by an actuator (not illustrated). In FIG. 6, the opening 56*a* is facing obliquely upward toward the driver seat side. Note that the rotatable member 56 may be fixed in a state where the opening 56*a* always faces the driver seat side or faces upward.

As is apparent from FIGS. 2 and 6, the engine sound from inside the engine room 2 is transmitted to a space below the tunnel part 21. In a state where the valve member 55 is opened, the engine sound transmitted into the tunnel part 21 reaches into the trim member 22 through the valve member 55 and is further transmitted into the cabin 3 through the opening 56*a*. In other words, the driver seated on the driver seat 8 hears the engine sound from near his/her feet, and the engine sound is localized to the default position T1-2. By closing the valve member 55, the engine sound is not localized to the default position T1-2. By opening one of the valve members 52 and 55 and closing the other member, the localized position of the engine sound is changeable between the specific position T1-1 and the default position T1-2. Any one or more of the components constituting the above-described structure that localizes the engine sound to the specific position T1-1 or the default position T1-2 may be referred to as the engine sound localizer.

For the localization of the audio sound to the second position T2, in this embodiment, as illustrated in FIG. 4, a total of four speakers, upper left and right speakers 60UL and 60UR and lower left and right speakers 60BL and 60BR, are provided. The pair of upper left and right speakers 60UL and 60UR are full-range tweeter speakers and attached to left and right front pillars 13L and 13R, respectively. The pair of lower left and right speakers 60BL and 60BR are also full-range tweeter speakers and attached to the left and right side doors 5L and 5R, respectively.

By using the four speakers 60UL, 60UR, 60BL, and 60BR, the audio sound is localized so as to be hearable from the second position T2 in a manner of known time alignment. Further, the second position T2 may be moved from the position illustrated in FIG. 4 to a desired position, such as downward, leftward (in one the of the width directions which is away from the driver seat 8 and approaches the front passenger seat 9), downward to the left (an oblique direction corresponding to a movement for separating from the driver seat 8 in the width directions while moving downward) or rearward of the driver seat, in the manner of known time alignment. Any one or more of the components constituting the above-described structure that localizes the audio sound to the second position T2 may be referred to as the audio sound localizer. One known method of localization through time alignment includes using a digital sound processor (DSP) such as DSP 70 described below with an appropriate algorithm. The DSP controls the phase and magnitude of the sound waves emitted by each speaker to align in such a way that some waves cancel each other out at certain locations where sound is not desired, and other waves are summed into a stronger wave at other locations where sound is desired. Using these techniques, the DSP 70 may process the audio signal for sounds emitted through each speaker to cause the perceived position of the sound to vary within the cabin of the vehicle.

Further, by using the four speakers 60UL, 60UR, 60BL, and 60BR, the alarm sound is localized so as to be hearable from the third position T3 in the manner of known time alignment. Thus, the alarm sound is superimposed on the audio sound and transmitted from the speakers 60UL, 60UR, 60BL, and 60BR.

Figure 7:
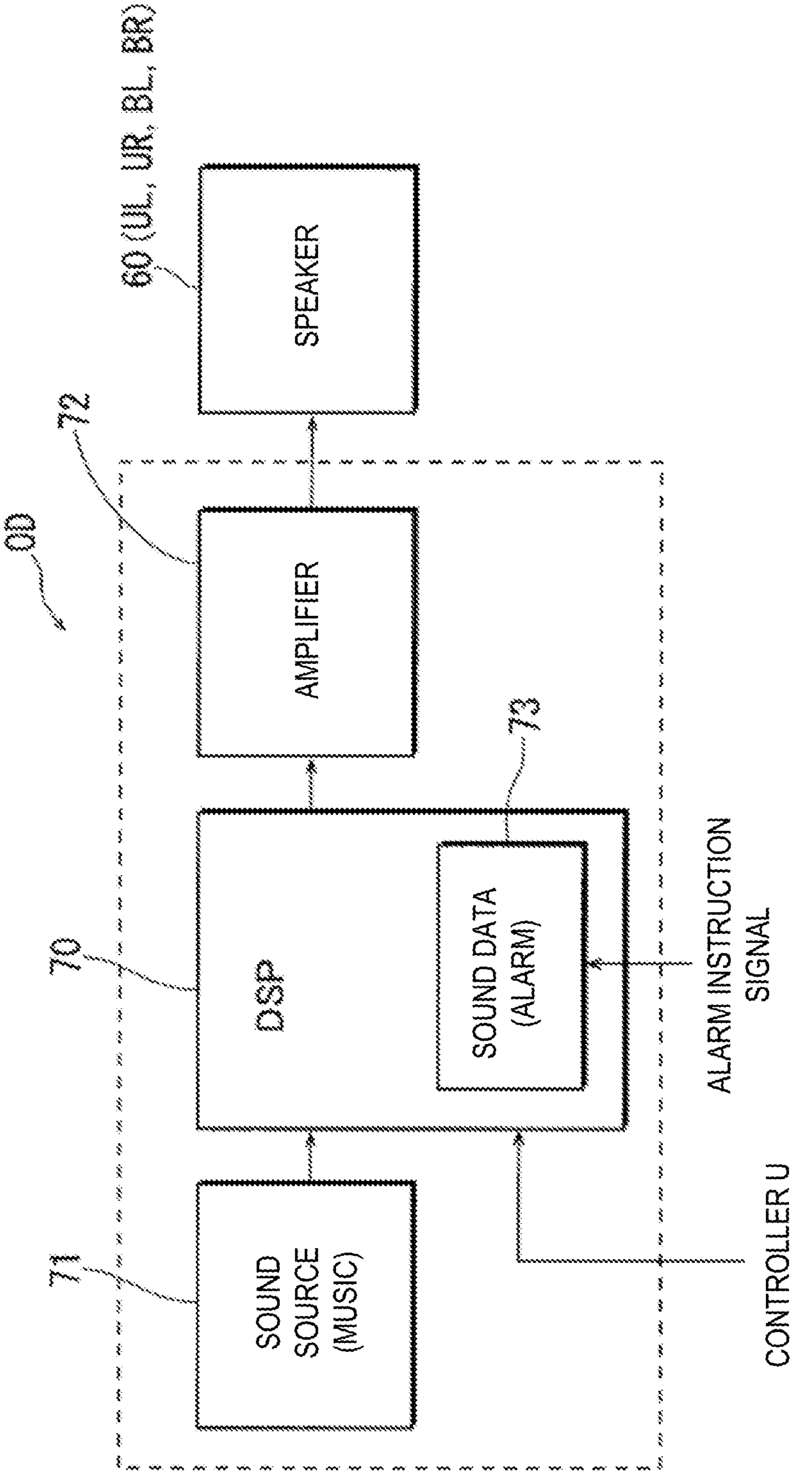
FIG. 7 is a block diagram illustrating one example of a control system of an audio device.

FIG. 7 illustrates one example of an audio device OD. In FIG. 7, the reference character "70" is a DSP. Once this DSP 70 receives a signal from a sound source 71 for audio, it performs the processing of time alignment described above so that the audio sound is localized to the second position T2, and drives the speakers 60UL, 60UR, 60BL, and 60BR via an amplifier 72.

The DSP 70 has a storage (memory) 73 storing an alarm sound data (model). Once the DSP 70 receives an instruction signal for issuing an alarm, it performs the processing of time alignment described above so that the alarm sound is localized to the third position T3, and drives the speakers 60UL, 60UR, 60BL, and 60BR via the amplifier 72.

In this embodiment, the exhaust sound is also localized. That is, a fourth position T4 where the driver is able to hear the exhaust sound is set in a substantially center part of a rear part of the cabin in the width directions (see FIGS. 1 and 2). This fourth position T4 is located at a structure in which a valve member is disposed at an opening leading into the cabin and has substantially the same structure as that illustrated in FIG. 3, and therefore the redundant description is omitted.

The fourth position T4 (the opening of the structure) is connected via a duct 81 with an extra chamber 80 opened to the outside and for ventilating air inside the cabin (see FIGS. 1 and 2). Since the extra chamber 80 is formed near the exhaust pipe 43A, the exhaust sound may effectively be transmitted to the fourth position T4. Note that the valve member at the fourth position T4 may normally be fully opened, or it may be closed when sports driving is not expected, such as when running in an urban area or at a low vehicle speed. Moreover, the opening of this valve member may gradually be increased as an engine speed increases.

Figure 8:
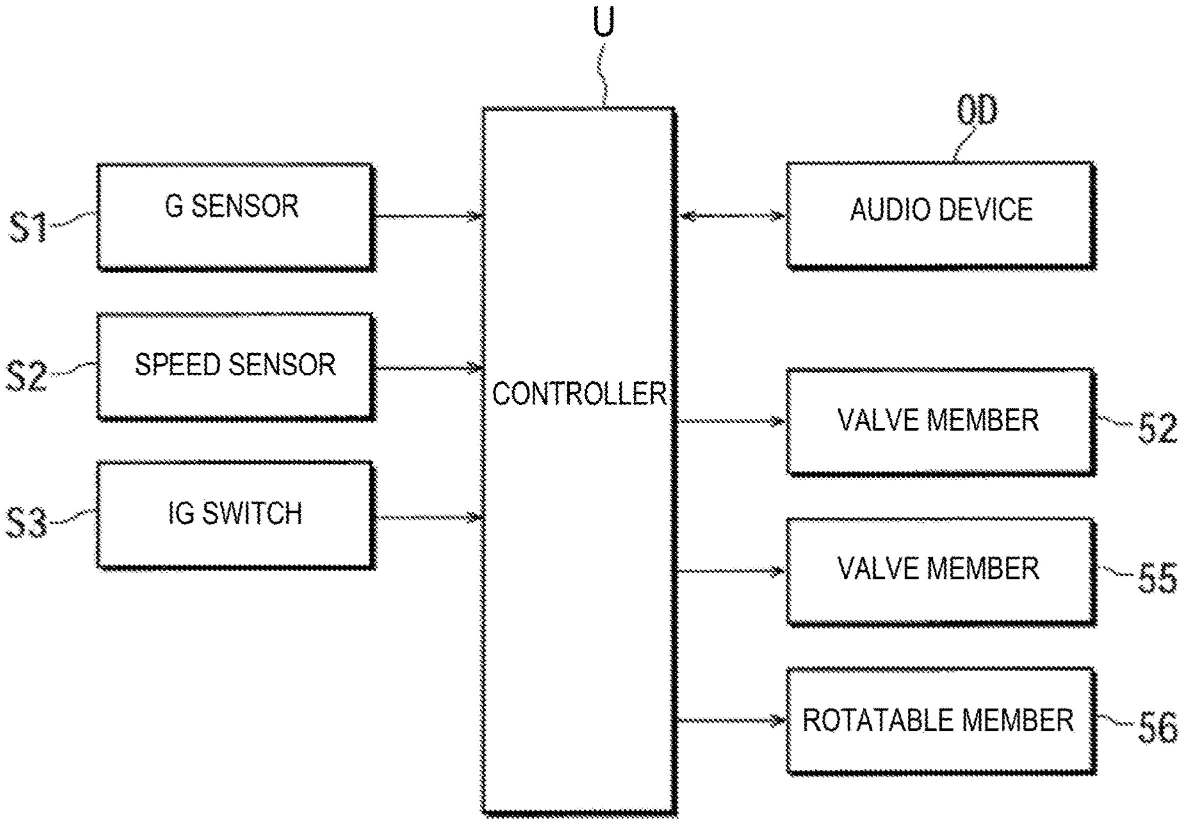
FIG. 8 is a view illustrating one example of a control system for changing the localized position of the engine sound.

FIG. 8 illustrates an example of a control system when changing the localized position between the specific position T1-1 and the default position T1-2. In FIG. 8, the reference character "U" is a controller configured by a microcomputer. The controller U is capable of instructing the audio device OD of FIG. 7 to change the second position T2. This controller U receives signals from sensors or switch S1 to S3. "S1" is a G sensor (i.e., an accelerometer) that detects g-forces which act on the vehicle body (accelerations and decelerations in the longitudinal and lateral directions). "S2" is an engine speed sensor which detects the engine speed. "S3" is an ignition switch. Any one or more of the sensors and/or switch S1 to S3 may be referred to as the traveling state detector. Moreover, the controller U controls, in addition to the audio device OD, the opening and closing of the valve members 52 and 55, and also controls the rotation of the rotatable member 56 (e.g., switching between the state where the opening 56*a* of the rotatable member faces toward the driver seat 8 (facing obliquely upward) and a state where it faces straight upward, based on a preset condition).

Figure 9:
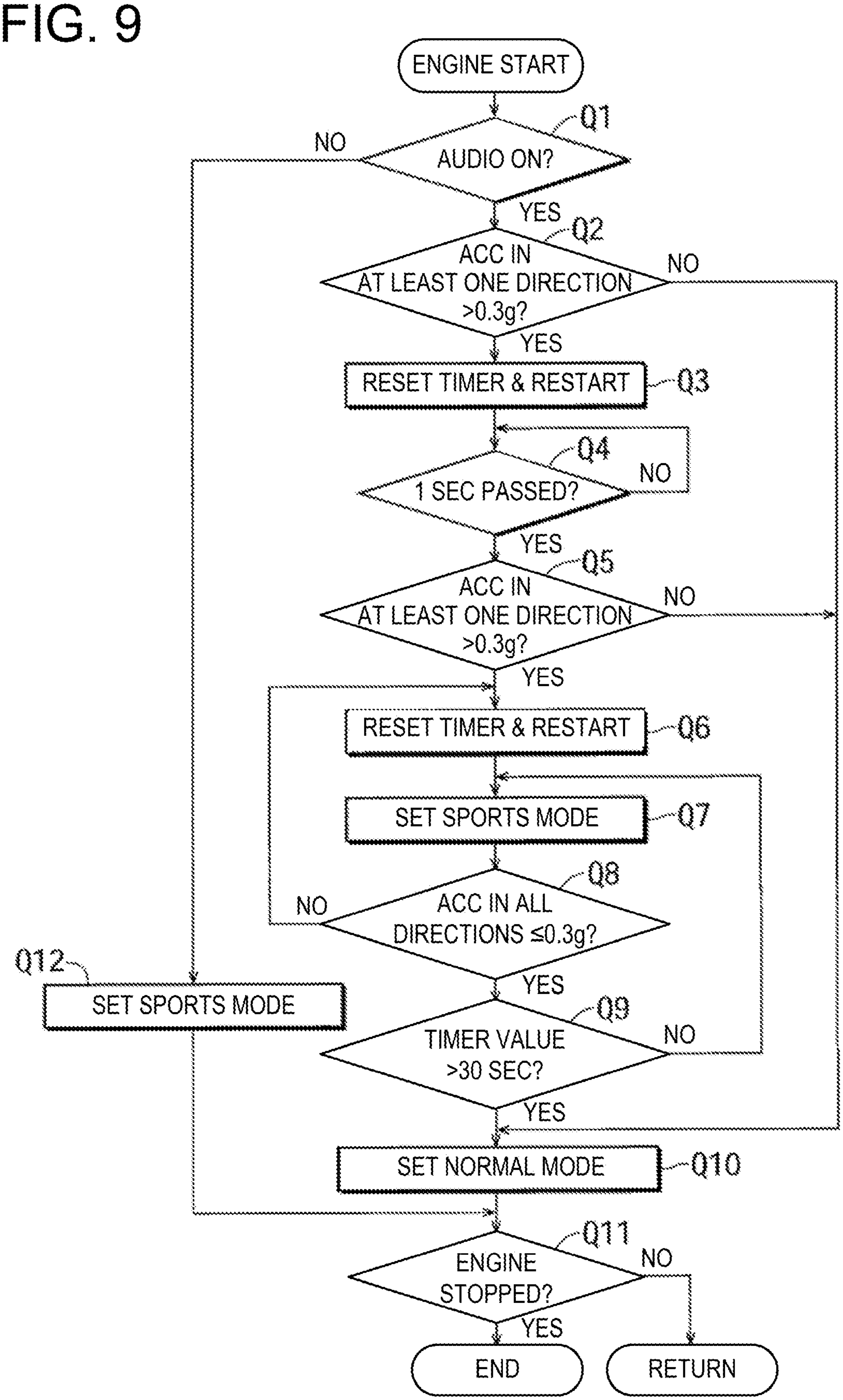
FIG. 9 is a flowchart illustrating a control example for changing the localized position of the engine sound.

Next, a control example of the controller U is described while referring to the flowchart of FIG. 9. Below, the reference character "Q" indicates steps. Further, the given traveling condition for moving the first position T1 from the default position T1-2 to the specific position T1-1 is that at least one of the lateral acceleration and the longitudinal acceleration which act on the vehicle body is higher than a given preset value. Moreover, the control of FIG. 9 is started when the ignition switch S3 is turned on. Further below, a normal mode indicates a mode in which the localized position of the engine sound is the default position T1-2, and a sports mode is a mode in which the localized position of the engine sound is the specific position T1-1.

First at Q1, whether the audio device OD is ON is determined. If the result of Q1 is YES, at Q2, whether at least one of the longitudinal acceleration and the lateral acceleration is higher than the given value (e.g., 0.3 g) is determined. If the result of Q2 is YES, at Q3, a timer is reset to an initial value 0 and starts counting again. Then at Q4, whether a given short period of time (1 second in this embodiment) has passed since a larger acceleration than the given value is detected, is determined. If the result of Q4 is NO, the determination at Q4 is repeated.

If the result of Q4 is YES, the same determination as Q2 is performed again at Q5. If the result of Q5 is YES, this means that a large acceleration is continuously (or repeatedly) generated in the short period of time, and the driver is actively driving to enjoy traveling.

If the result of Q5 is YES, at Q6, the timer is reset to 0 and starts counting again. Then at Q7, the sports mode is set and the localized position of the engine sound is moved (changed) from the default position T1-2 to the specific position T1-1.

After Q7, at Q8, whether the longitudinal and lateral acceleration are both equal to or less than a given value (0.3 g in this embodiment) is determined. If the result of Q8 is NO, the process returns to Q6.

If the result of Q8 is YES, at Q9, whether the count value of the timer exceeds a given long period of time (30 seconds in this embodiment) is determined. If the result of Q9 is NO, the process returns to Q7.

If the result of Q9 is YES, this means that the state where hard driving (sports driving) is not performed is clearly confirmed, and thus at Q10, the mode is changed to the normal mode (resume to the default position T1-2).

If the result of Q1 is NO, at Q12, the sports mode is set (however, the audio sound is not transmitted into the cabin). Note that if the result of Q1 is NO, the normal mode may be set (the process may return directly).

If the result of Q2 or Q5 is NO, the process shifts to Q10.

After Q10 or Q12, at Q11, whether the engine is stopped (whether the ignition switch S3 is turned off) is determined. If the result of Q11 is NO, the process returns to Q1. On the other hand, if the result of Q11 is YES, the control is terminated.

As is apparent from the above description, in the embodiment of FIG. 9, when the sports mode is set, the sports mode is maintained (a frequent change between the sports mode and the normal mode is reduced) until it is confirmed that the given traveling condition for setting the sports mode remains not satisfied for a given long period of time (30 seconds in the embodiment). In order to prevent or reduce the frequent change between the sports mode and the normal mode, for example, the given value (the value of the acceleration) of Q8 may be set smaller than that of Q2 or Q5 by a given small value.

Figure 10:
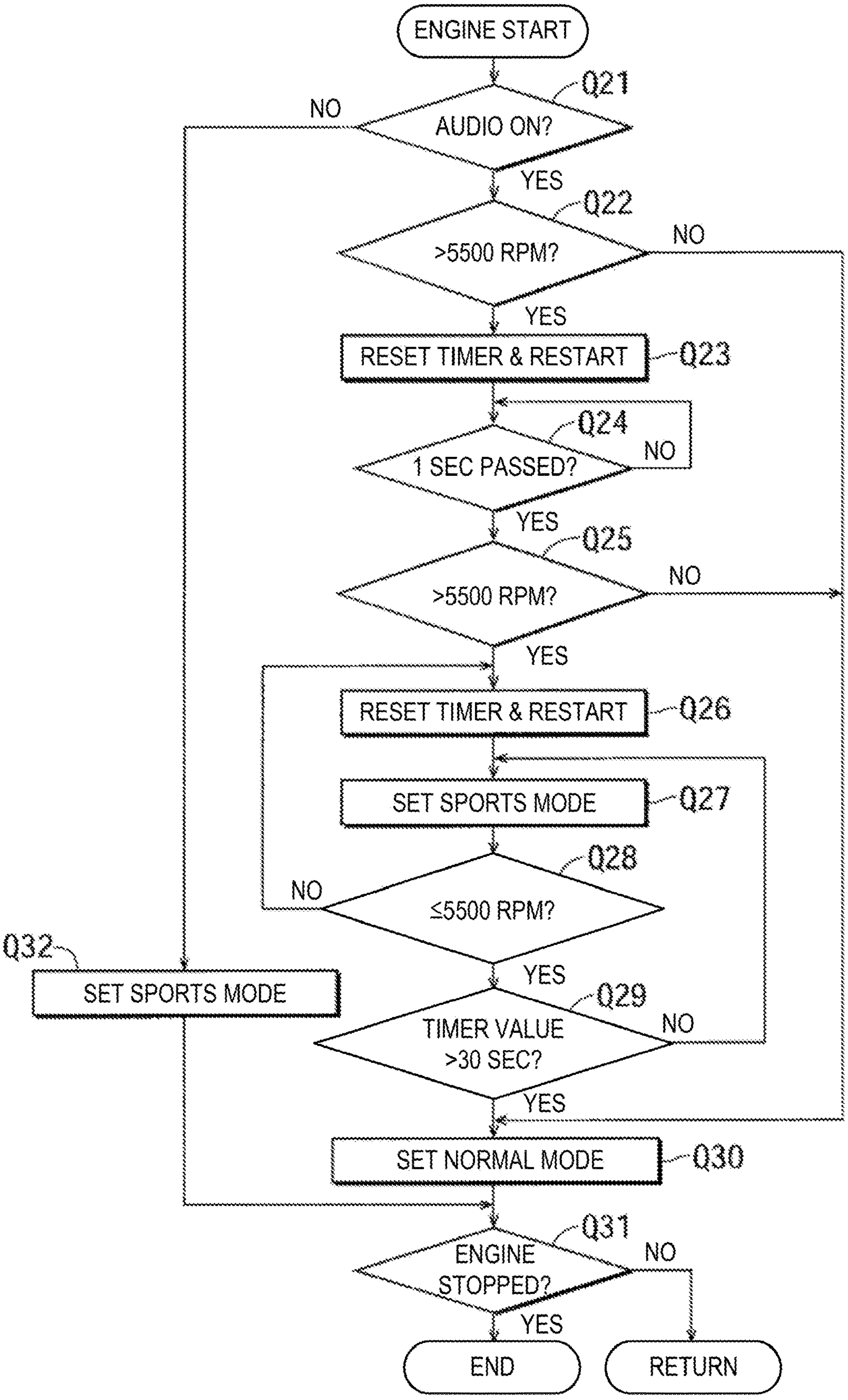
FIG. 10 is a flowchart illustrating another control example for changing the localized position of the engine sound.

FIG. 10 illustrates another control example corresponding to FIG. 9. In this control example, as the given traveling condition, the engine speed is used instead of the acceleration acting on the vehicle body. That is, at Q22 (corresponding to Q2 in FIG. 9), Q25 (corresponding to Q5 in FIG. 9), and Q28 (corresponding to in FIG. 9), whether the engine speed is higher than (or equal to or lower than) a given speed (5,500 rpm in this embodiment). That is, in this embodiment, a highest allowable engine speed is set to about 7,500 rpm, and the engine speed of 5,500 rpm as the given value is set as a high speed which is lower than the highest allowable speed by a given amount (around a speed at which a highest output or the highest torque is generated). The control of FIG. 10 is only different from the control in FIG. 9 in that the engine speed is used instead of the acceleration in FIG. 9, therefore redundant descriptions are omitted.

Further, the switching between the sports mode and the normal mode may be performed according to an accelerator opening, and in this case, the sports mode may be set when the accelerator opening is large (above a given opening), and the normal mode may be set when the accelerator opening is small.

Although the embodiment is described above, the present disclosure is not limited to the embodiment, and suitable changes are possible within the range described in the claims. The localized position of the engine sound (the default position T1-2 or the specific position T1-1) and its size may suitably be selected. For example, the default position T1-2 may be set to a position in the dashboard near the height of the driver's feet seated on the driver seat 8, or in a lower part of the instrument panel 11, etc. Note that the default position T1-2 is preferably set to a position lower than the upper surface of the instrument panel 11 due to its relationship with the specific position T1-1. Further, the specific position T1-1 may be set in the upper surface of the instrument panel 11 or shifted to the driver seat 8 side in the width directions, and in order to cause the driver to particularly recognize the engine sound, it is preferably set at a position forward of the driver seated on the driver seat 8 and in or higher than the upper surface of the instrument panel 11.

Particularly, the positional relationship between the specific position T1-1 and the default position T1-2 preferably applies the following mode. The specific position T1-1 is located on the upper side of the default position T1-2. The specific position T1-1 is located forward of the default position T1-2. The default position T1-2 is set at a position lower than the upper surface of the instrument panel 11, while the specific position T1-1 is set at a position forward of the driver, at the same height of or higher than the upper surface of the instrument panel 11. The default position T1-2 is set at a position rearward of the instrument panel 11 and lower than the upper surface thereof, while the specific position T1-1 is set at a position forward of the driver, at the same height of or higher than the upper surface of the instrument panel 11. The default position T1-2 is set lower than the second position T2, while the specific position T1-1 is set higher than the second position T2.

The area and/or position of the opening 56*a* of the rotatable member 56 constituting the default position T1-2 may be changed. The opening 56*a* may be formed on both sides of the driver seat 8 and the front passenger seat 9 side. In this case, the area of the opening 56*a* on the driver seat 8 side may be made larger than that on the front passenger seat 9 side, or the opening areas on the driver seat 8 side and on the front passenger seat 9 side may be adjusted independently from each other (automatic adjustment or manual adjustment).

The second position T2 which is the localized position of the audio sound may be moved (changed) depending on the situation (when particularly emphasizing the engine sound). For example, when the specific position T1-1 is selected as the localized position of the engine sound, the second position T2 may be moved downward from the position illustrated in FIG. 4, to the front passenger seat 9 side, obliquely downward to the front passenger seat 9 side, to the rear part of the cabin, etc. The alarm sound may include a rev limiter sound which notifies the engine speed reaching an upper limit. The localized position of the alarm sound is suitably changeable, but it is preferably different from that of the engine sound or the audio sound. Alternatively, the alarm sound may not be localized. Similarly, the exhaust sound may not be localized. The present disclosure is not limited to be applied to the convertible but is also applicable to various types of vehicles, such as a sedan type, a sport utility vehicle (SUV) type, and a four-wheel drive vehicle. The application may also be to a vehicle in which the transmission 31 is disposed in the rear part of the vehicle (at the position of the differential 40), a vehicle in which the engine 30 is disposed rearward of the cabin, or a front-wheel drive vehicle having no propeller shaft 41 (i.e., a front-engine, front-wheel-drive (FF) vehicle). The facing position of the opening 56*a* of the rotatable member 56 may be selectable on the front passenger's side. It is needless to say that the purpose of the present disclosure is not limited to what is explicitly described, but also implicitly includes providing what is expressed as substantially preferable or advantageous.

The present disclosure is preferable for distinguishing the engine sound and the audio sound from each other and more clearly recognizing the engine sound as needed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

T1-1: Specific Position
T1-2: Default Position
T2: Audio Sound Position
T3: Alarm Sound Position
OD: Audio Device
U: Controller
S1: G Sensor (accelerometer)
S2: Engine Speed Sensor
S3: Ignition Switch
1: Dashboard
2: Engine Bay
3: Cabin
5L, 5R: Side-Door
8: Driver Seat
9: Front Passenger Seat
11: Instrument Panel
11*a*: Opening (For Engine Sound Transmission)
12: Front Windshield
13L, 13R: Front Pillar
20: Floor Panel
21: Tunnel Part
22: Trim Member
23: Kick-up Part
24: Rear Panel
30: Engine
31: Transmission
40: Differential
41: Propeller Shaft
42: Exhaust Passage
43: Muffler
43A: Exhaust Pipe
50: Opening (For Engine Sound Transmission)
51: Film Member
52: Valve Member
55: Valve Member
56: Rotatable Member
56*a*: Opening
60UL, 60UR, 60BL, 60BR: Speaker
70: DSP
71: Sound Source (For Audio)
72: Amplifier
73: Storage (For Alarm Sound)
80: Extra Chamber
81: Duct

What is claimed is:

1. A sound system for a vehicle including an engine and an audio device for an internal space of a cabin as sound sources disposed at given positions of the vehicle, comprising:

an engine sound localizer configured to transmit a first sound from an engine bay to a first position in the cabin such that a vehicle driver inside the cabin hears the first sound from the first position, the first sound being an engine sound generated by the engine;

a controller configured to control the engine sound localizer to change the first position; and a traveling state detector configured to detect a traveling state of the vehicle, wherein the controller controls the engine sound localizer to set the first position at a default position and, when a given traveling state is detected by the traveling state detector, change the first position to a specific position at which the vehicle driver is able to hear the engine sound more clearly than at the default position.

2. The sound system of claim 1, further comprising an audio sound localizer configured to localize a second sound generated by the audio device to cause the driver to hear the second sound from a second position that is different from the first position.

3. The sound system of claim 2, wherein the specific position is located upward of the default position.

4. The sound system of claim 2, wherein the specific position is located forward of the default position.

5. The sound system of claim 2, wherein the default position is set lower than an upper surface of an instrument panel, and the specific position is set forward of the driver, at the same height of or higher than the upper surface of the instrument panel.

6. The sound system of claim 2, wherein the default position is set rearward of an instrument panel and lower than an upper surface of the instrument panel, and the specific position is set forward of the driver, at the same height of or higher than the upper surface of the instrument panel.

7. The sound system of claim 2, wherein the default position is set lower than the second position, and the specific position is set higher than the second position.

8. The sound system of claim 1, wherein the specific position is located upward of the default position.

9. The sound system of claim 1, wherein the specific position is located forward of the default position.

10. The sound system of claim 1, wherein the default position is set lower than an upper surface of an instrument panel, and the specific position is set forward of the driver, at the same height of or higher than the upper surface of the instrument panel.

11. The sound system of claim 1, wherein the default position is set rearward of an instrument panel and lower than an upper surface of the instrument panel, and the specific position is set forward of the driver, at the same height of or higher than the upper surface of the instrument panel.

12. The sound system of claim 1, wherein the given traveling state is a traveling state where an operation load on a person in the vehicle increases.

13. The sound system of claim 12, wherein the specific position is located upward of the default position.

14. The sound system of claim 13, wherein the specific position is located forward of the default position.

15. The sound system of claim 14, wherein the default position is set lower than an upper surface of an instrument panel, and the specific position is set forward of the driver, at the same height of or higher than the upper surface of the instrument panel.

16. The sound system of claim 15, wherein the default position is set rearward of an instrument panel and lower than an upper surface of the instrument panel, and the specific position is set forward of the driver, at the same height of or higher than the upper surface of the instrument panel.

* * * * *